(12) United States Patent
Ha et al.

(10) Patent No.: US 10,803,659 B2
(45) Date of Patent: *Oct. 13, 2020

(54) AUTOMATIC THREE-DIMENSIONAL SOLID MODELING METHOD AND PROGRAM BASED ON TWO-DIMENSIONAL DRAWING

(71) Applicant: URBANBASE INC., Seoul (KR)

(72) Inventors: Jinwoo Ha, Seoul (KR); Kyoungwoo Lee, Yangsan-si (KR); Deockjoong Kim, Seongnam-si (KR)

(73) Assignee: URBANBASE INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,842

(22) Filed: Dec. 18, 2019

(65) Prior Publication Data

US 2020/0126293 A1    Apr. 23, 2020

Related U.S. Application Data

(63) Continuation of application No. 15/605,054, filed on May 25, 2017, now Pat. No. 10,565,788, which is a
(Continued)

(30) Foreign Application Priority Data

Nov. 28, 2014    (KR) ........................ 10-2014-0168879

(51) Int. Cl.
*G06T 17/10*    (2006.01)
*G06T 17/00*    (2006.01)
(Continued)

(52) U.S. Cl.
CPC ............ *G06T 17/10* (2013.01); *G06T 15/506* (2013.01); *G06T 17/00* (2013.01); *G06T 19/20* (2013.01); *G06T 2210/04* (2013.01)

(58) Field of Classification Search
CPC ....... G06T 15/506; G06T 17/00; G06T 17/10; G06T 17/30; G06T 17/50; G06T 17/5004; G06T 19/20; G06T 2210/04; G06Q 50/163

See application file for complete search history.

(56) References Cited

U.S. PATENT DOCUMENTS 7,509,241 B2    3/2009 Guo et al.
9,019,269 B1    4/2015 Pogue
(Continued)

FOREIGN PATENT DOCUMENTS

CN    105205198 A    12/2015
JP    S61-286984 A    12/1986
(Continued)

OTHER PUBLICATIONS

International Search Report issued in PCT/KR2015/010985; dated Feb. 4, 2016.
(Continued)

*Primary Examiner* — Phuc N Doan
(74) *Attorney, Agent, or Firm* — Studebaker & Brackett PC

(57) ABSTRACT

The present disclosure relates to an automatic three-dimensional solid modeling method and program based on a two-dimensional drawing, including at least: acquiring a drawing image; generating a figure by extracting line segments in the drawing image; identifying sub-areas within the figure and identifying spatial types of the sub-areas; and generating a three-dimensional space model by applying height information corresponding to the spatial types of the sub-areas. The present disclosure is convenient in that there is no need to visit the real three-dimensional space in order
(Continued)

to implement the corresponding space on a computer, and can remarkably reduce the time required to implement the three-dimensional space.

10 Claims, 6 Drawing Sheets

Related U.S. Application Data continuation of application No. PCT/KR2015/010985, filed on Oct. 16, 2015.

(51) Int. Cl.
*G06T 15/50* (2011.01)
*G06T 19/20* (2011.01)

(56) References Cited

U.S. PATENT DOCUMENTS

| | | |
|---|---|---|
| 10,026,218 B1 | 7/2018 | Mertens et al. |
| 2008/0122859 A1 | 5/2008 | Cazier et al. |
| 2009/0138113 A1 | 5/2009 | Hoguet |
| 2010/0023250 A1 | 1/2010 | Mays et al. |
| 2010/0275018 A1 | 10/2010 | Pedersen |
| 2011/0071805 A1 | 3/2011 | Pendyala et al. |
| 2011/0218777 A1 | 9/2011 | Chen et al. |
| 2012/0183204 A1 | 7/2012 | Aarts et al. |
| 2013/0136351 A1 | 5/2013 | Ishida et al. |
| 2013/0147799 A1 | 6/2013 | Hoguet |
| 2014/0267717 A1 | 9/2014 | Pitzer et al. |
| 2014/0301633 A1 | 10/2014 | Furukawa et al. |
| 2016/0110823 A1 | 4/2016 | Wood et al. |
| 2017/0316115 A1 | 11/2017 | Lewis et al. |
| 2019/0130233 A1 | 5/2019 | Stenger et al. |

FOREIGN PATENT DOCUMENTS

| | | |
|---|---|---|
| JP | H08-006989 A | 1/1996 |
| JP | H09-297861 A | 11/1997 |
| JP | H10-124547 A | 5/1998 |
| JP | 2003-006674 A | 1/2003 |
| JP | 2007-115238 A | 5/2007 |
| JP | 2009-258823 A | 11/2009 |
| KR | 10-2014-0062831 A | 5/2014 |

OTHER PUBLICATIONS

Kang et al.; 3D GIS Network Modeling of Indoor Building Space Using CAD Plans; Korean Journal of Geomatics 23 (4); Dec. 2005; pp. 278-384.

Shah, Create a 3D Floor Plan Model From an Architectural Schematic in Blender, URL: https://cgi.tutsplus.com/tutorials/create-a-3d-floor-plan-model-from-an-architectural-schematic-in-blender-cg-13350, Jan. 2012.

An Office Action mailed by the Japanese Patent Office dated Jun. 19, 2018, which corresponds to Japanese Patent Application No. 2017-528837 and is related to U.S. Appl. No. 15/605,054; with English translation.

The extended European search report issued by the European Patent Office dated Nov. 22, 2017, which corresponds to European Patent Application No. 15864214.0-1502 and is related to U.S. Appl. No. 15/605,054.

Communication Pursuant to Rule 164(1) EPC issued by the European Patent Office dated Aug. 31, 2017, which corresponds to European Patent Application No. 15864214.0-1502 and is related to U.S. Appl. No. 15/605,054.

Santos et al., "Efficient Creation of 3D Models from Buildings' Floor Plans", International Journal of Interactive Worlds, Nov. 1, 2011, 28 pages, XP055400581, DOI: 105171/2011.897069.

Bell et al., "Contour Tracking and Corner Detection in a Logic Programming Environment", IEEE Transactions on Pattern Analysis and Machine Intelligence, IEEE Computer Society, vol. 12, No. 9, Sep. 1, 1990, pp. 913-917, XP 000147482, ISSN: 0162-8828, DOI: 10.1109/3457685, USA.

Turner et al., "Floor Plan Generation and Room Labeling of Indoor Environments from Laser Range Data", 2014 International Conference on Computer Graphics Theory and Applications (GRAPP), Scitepress, Jan. 5, 2014, pp. 1-12, XP032791898, California, USA.

Weber et al., "a.SCatch: Semantic Structure for Architectural Floor Plan Retrieval", Jul. 19, 2010, Case-Based Reasoning. Research and Development, Springer Berlin Heidelberg, pp. 510-524, XP019146602, ISBN: 378-3-642-14273-4, Munich, Germany.

Ahmed et al., "Automatic Room Detection and Room Labeling from Architectural Floor Plans", 2012 10th IAPR International Workshop on Document Analysis Systems, IEEE Computer Society, Mar. 27, 2012, pp. 339-343, XP032178217, DOI: 10.1109/DAS.2012.22, ISBN: 978-1-4673-0868-7, Kaiserslautern, Germany.

Musicchu: "How to Resize a Floor Plan to Correct Scale in Sketchup Fast!", Sep. 10, 2014, XP054977885, URL: https://www.youtube.com/Watch?v=A42Fa53FM1E.

FIG. 4A
FIG. 4B
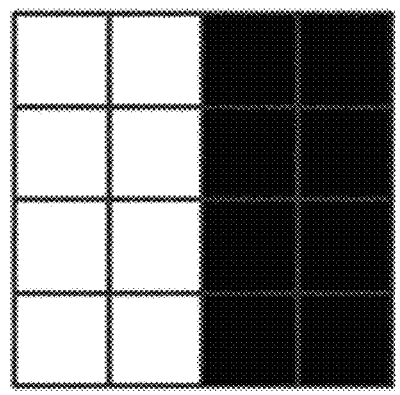
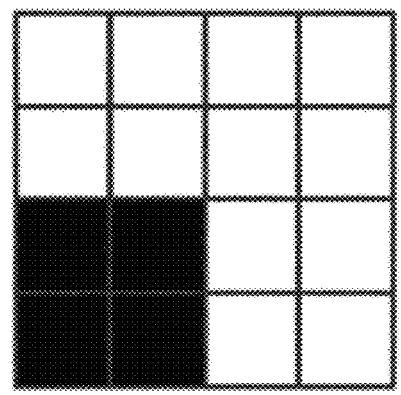

AUTOMATIC THREE-DIMENSIONAL SOLID MODELING METHOD AND PROGRAM BASED ON TWO-DIMENSIONAL DRAWING

CROSS-REFERENCE TO RELATED APPLICATIONS

The present application is a continuation of U.S. patent application Ser. No. 15/605,054 filed May 25, 2017, which is a continuation of International Patent Application No. PCT/KR2015/010985, filed Oct. 16, 2015, which is based upon and claims the benefit of priority to Korean Patent Application No. 10-2014-0168879, filed on Nov. 28, 2014. The disclosures of the above-listed applications are hereby incorporated by reference herein in their entirety.

BACKGROUND

Embodiments of the inventive concept described herein relate to an automatic three-dimensional (3D) solid modeling method and program based on a 2D drawing, and more particularly, relate to a method and program for extracting characteristics of a 3D space through a 2D drawing and performing automatic 3D solid modeling to obtain information of the 3D space without directly capturing the 3D space.

There is an image capturing scheme using a panoramic camera as a conventional method for obtaining 3D space information. Since a user should directly visit a space and should capture the space to obtain 3D space information in the image capturing scheme, there are concerns about invasion of privacy due to objects of a captured real space and the like. Further, image capturing using the panoramic camera is expensive in cost. It is impossible to extract and use physical information about a real space since the captured image is 2D image data.

Further, there is a manner of making a 3D modeling file, which progresses on a manual basis, as a conventional method for obtaining 3D space information. Since professional manpower should directly perform modeling, this is expensive due to personnel expenses and it takes a long time to make the 3D modeling file.

Further, recently, there is a scan scheme using a mobile device, such as Google's Project Tango. The Project Tango is a project for performing 3D modeling in real time using a mobile device into which a 3D camera and a sensor are loaded. In other words, the Project Tango is a manner of obtaining images while recognizing a direction in which an object is captured through the sensor of the mobile device, recognizing a peripheral space, and implementing the recognized space as a 3D space. However, in case of using this, since it takes 1 hour 30 minutes or more to scan a single space of 99.17 $m^2$, it takes a long time. It is difficult to distinguish a building element such as a wall from indoor furniture upon scanning the single space.

Therefore, there is a need for a 3D modeling scheme of making indoor space information, which is taken during a short time and is inexpensive.

SUMMARY

Embodiments of the inventive concept provide an automatic 3D solid modeling method and program based on a 2D drawing for recognizing drawing information and generating 3D space information through an algorithm generated according to an expression and a rule reflected upon building, without visiting a space which needs 3D indoor space information.

According to an aspect of an embodiment, an automatic 3D solid modeling method based on a 2D drawing may include obtaining a drawing image, generating a figure by extracting line segments from the drawing image, identifying a sub-area in the figure and identifying a spatial type of the sub-area, and generating a 3D spatial model by applying height information corresponding to the spatial type of the sub-area.

The generating of the figure may include recognizing the line segments based on a chromaticity difference between elements in the drawing image and identifying a vertex of the recognized line segments and generating the figure based on the vertex The identifying of the vertex of the recognized line segments may include recognizing a point, where a consecutive color is cut off, as the vertex while moving a cluster of a size in one direction along the color.

The generating of the figure may include obtaining real area data, extracting an outermost line of the figure, determining the entire region, and calculating an area of the entire region, and calculating a rate by comparing the calculated area with the obtained real area data, and enlarging each of the line segments based on the rate.

The calculating of the area may include setting an external point of a space plot plan in the drawing image to an origin point and assigning a coordinate to the identified vertex with respect to the origin point, identifying an outermost vertex based on the assigned vertex coordinate and extracting the outermost line, and calculating the area of the entire region based on the extracted outermost line.

The method may further include applying an element corresponding to the spatial type of the sub-area.

The identifying of the spatial type may include comparing measurement data of the sub-area with data included in a guideline for each spatial type, the guideline being stored in a database and recognizing the spatial type corresponding to the measurement data. The applying of the height information or the applying of the element may include searching for and applying the height information or the element corresponding to the spatial type in the guideline.

The method may further include determining materials of a floor or wall corresponding to the spatial type and applying the determined materials to the floor or wall to correspond to a scale of a 3D space and applying household furniture corresponding to the spatial type or a form of a space.

The method may further include calculating and determining a surface which receives light by a location of a light source and correcting a 3D image in consideration of a location or color of a shape in the 3D space.

According to another aspect of an embodiment, an automatic 3D solid modeling program based on a 2D drawing may be combined with hardware and perform the automatic 3D solid modeling method based on the 2D drawing and may be stored in a medium.

According to an embodiment of the inventive concept, there may be the following various effects.

First, the embodiment of the inventive concept may be convenient without the necessity of visiting a real 3D space to implement the real 3D space on a computer and may remarkably reduce time taken to implement a 3D space. In other words, the embodiment of the inventive concept may shorten time taken to make one 3D space within two minutes.

Second, users may provide the generated 3D space information online. Others may verify space information similar to a real thing through visual stereoscopic data without vising a real space.

Third, the embodiment of the inventive concept may provide space information of high reliability by performing 3D modeling based on an accurate numeric value. In other words, since the computer generates a 3D file including real physical information such as a length, a width, and a volume of a real space, users may verify and use a real physical numeric value through a modeled 3D space.

Fourth, since the user uses only a 2D drawing image and real area data when performing 3D space modeling, the embodiment of the inventive concept may be very convenient because there is little information for requesting the user to perform the modeling.

Fifth, the embodiment of the inventive concept may generate a 3D space using real physical information (a real size) and may use the generated 3D space as a platform of the latest information technology (IT) such as augmented reality (AR) and internet of things (IoT). Further, the embodiment of the inventive concept may use the generated 3D space as a cyber space, such as a game or virtual reality (VR), which may be experienced by the user and may use the generated 3D space as visual data and resources of an interior architectural field and a real estate relevant field.

Lastly, the embodiment of the inventive concept may accurately determine a spatial type as the computer analyzes and determines the spatial type according to a spatial type determination algorithm based on a building code or an architectural design manual. Further, the embodiment of the inventive concept may simply generate a space corresponding to reality by applying a height of a space or an element of the space (a size of a door and the like) based on the building code or the architectural design manual.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 4A and 4B are drawings illustrating examples in which a cluster which scans a vertex passes through a specific point of a line segment of a figure;

DETAILED DESCRIPTION

Figure 1:
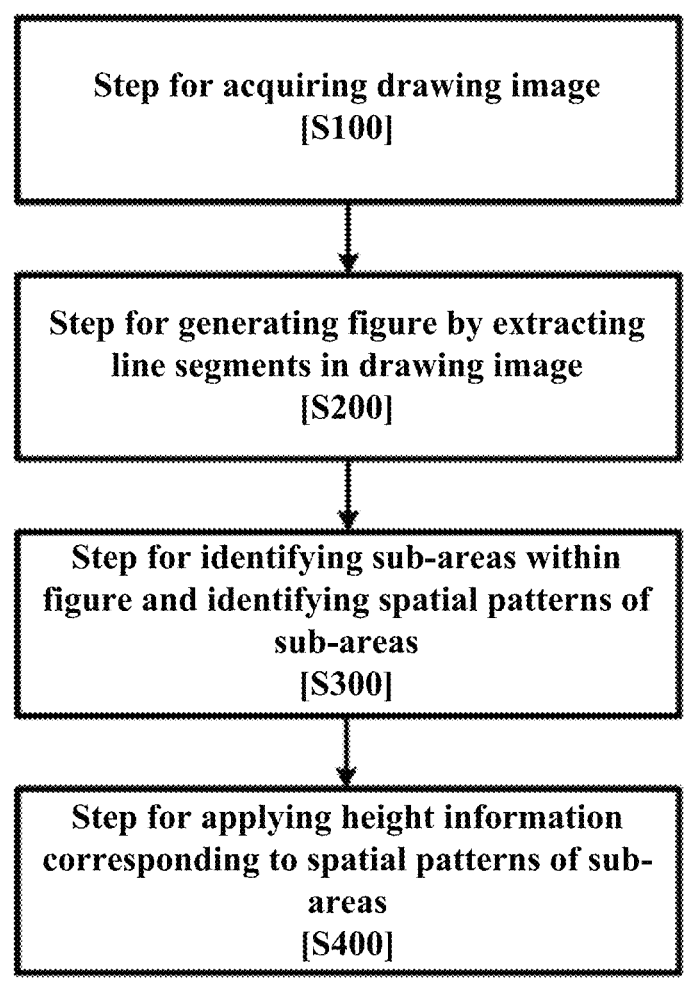
FIG. 1 is a flowchart illustrating an automatic 3D solid modeling method based on a 2D drawing according to an embodiment of the inventive concept.

Hereinafter, a description will be given in detail of exemplary embodiments of the inventive concept with reference to the accompanying drawings. Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the disclosure to those skilled in the art, and the inventive concept will only be defined by the appended claims. Like reference denotations refer to like elements throughout the specification.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Terms used in the specification are used to describe embodiments of the inventive concept and are not intended to limit the scope of the inventive concept. In the specification, the terms of a singular form may include plural forms unless otherwise specified. The expressions "comprise" and/ or "comprising" used herein indicate existence of one or more other elements other than stated elements but do not exclude presence of additional elements.

A drawing image 100 in the specification may be an image including a 2D drawing of a space in a building such as a house, an apartment, a store, or the like. In other words, the drawing image 100 may include a space plot plan 110 and a blank area 120. The space plot plan 110 may correspond to a portion indicating internal space arrangement.

A spatial type in the specification may refer to a function or classification of a space in a building. In other words, the spatial type may correspond to information about whether the entire area of a structure is a space of any purpose. For example, the spatial type may mean that the entire area of the structure is any space among patterns such as a residential space and a commercial space. Further, the spatial type may correspond to information about whether a specific sub-area in the entire area in a drawing is a space of any purpose. For example, if the space is an apartment, the spatial type may mean that the specific sub-area corresponds to any space among patterns such as a room, a bathroom, a porch, a kitchen, and the like.

Further, a guideline in the specification may refer to criteria defined or advised in a building code and an architecture design manual. In other words, the guideline may be criteria applied to upon building. An area of a space, a width and length ratio, a size of a window, a size of a door, a ceiling height, and the like may be determined according to the guideline. Thus, the guideline may be stored in a database of a computer and may be used such that the computer determines a spatial type by comparing the guideline with numeric values measured from a drawing.

Further, measurement data in the specification may be numeric data measured from a figure to identify a characteristic of each space. In other words, the measurement data may correspond to information such as an area of a space measured from a figure extracted from a drawing image, a width and length ratio, and a location of a sub-area in the entire area and may be used such that the computer identifies a spatial type by comparing the measurement data with the guideline.

Figure 2:
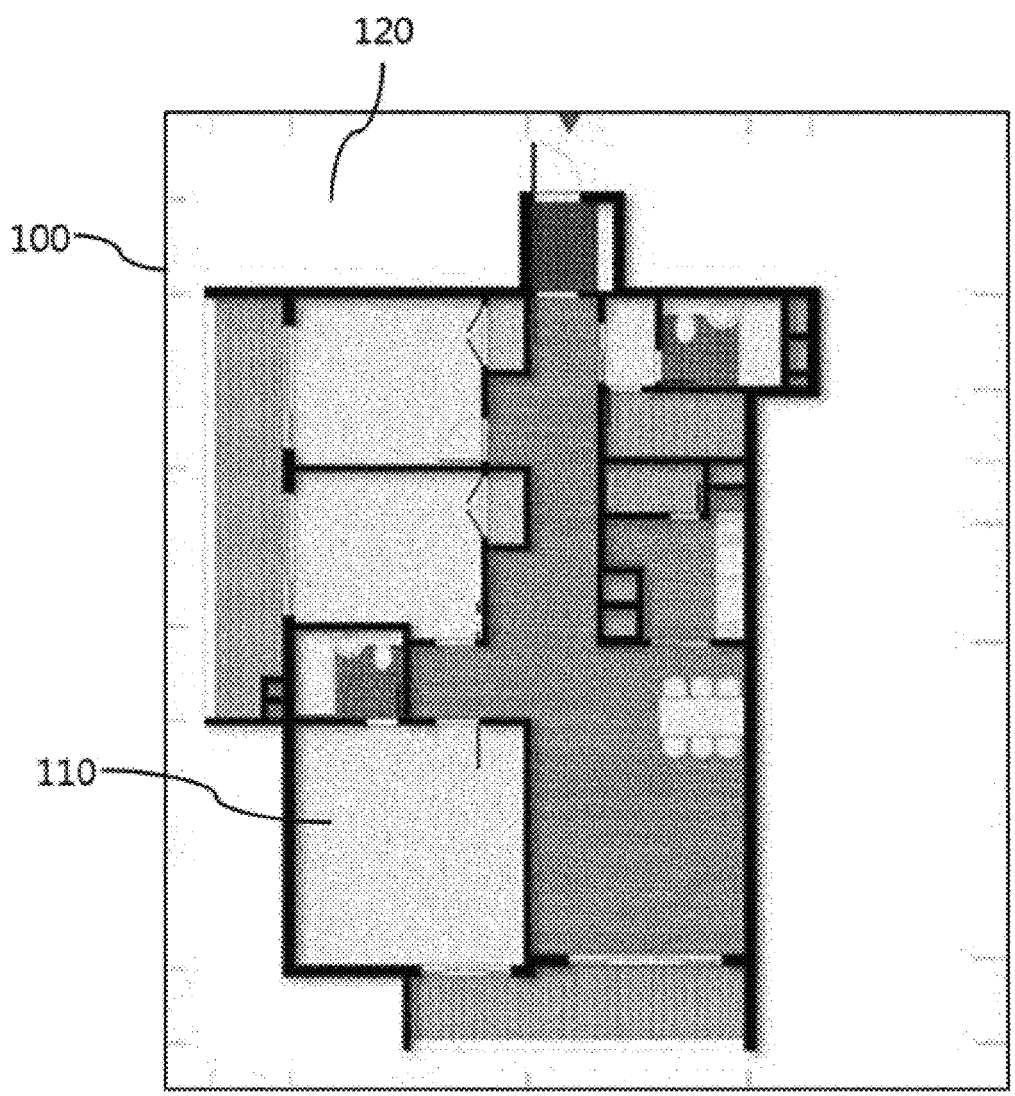
FIG. 2 is a drawing illustrating a drawing image including a space plot plan according to an embodiment of the inventive concept.
Figure 3:
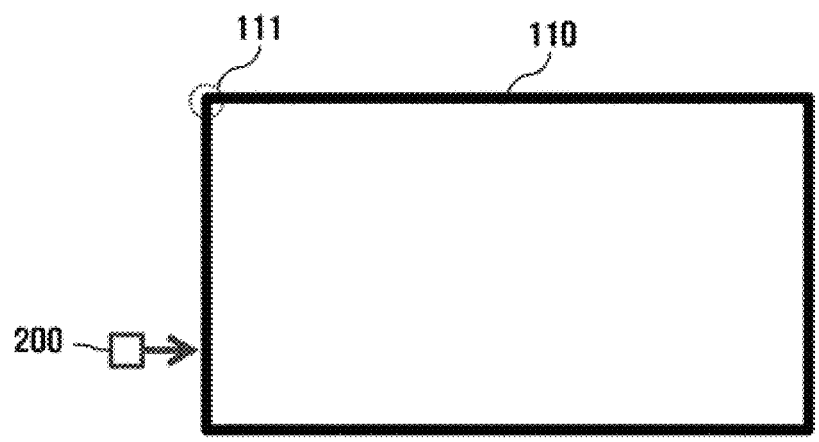
FIG. 3 is a drawing illustrating a process of extracting a vertex in a drawing image.
Figure 5:
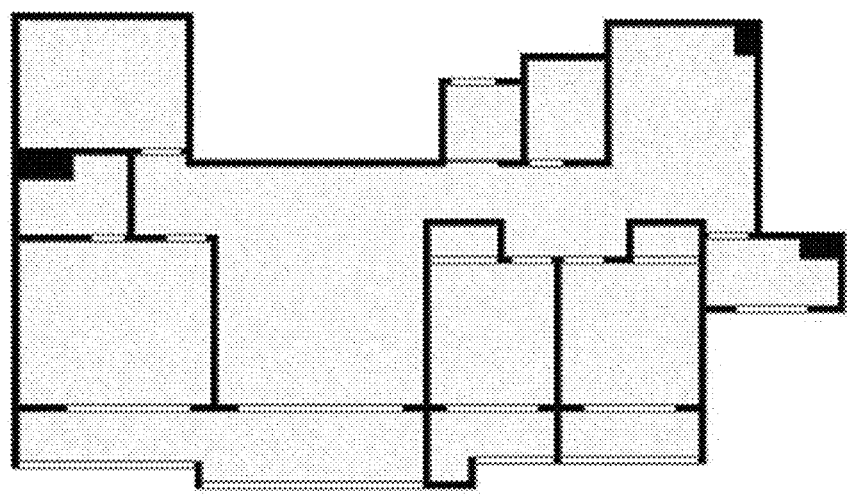
FIG. 5 is a drawing illustrating a process of extracting a line segment from a drawing image.
Figure 6:
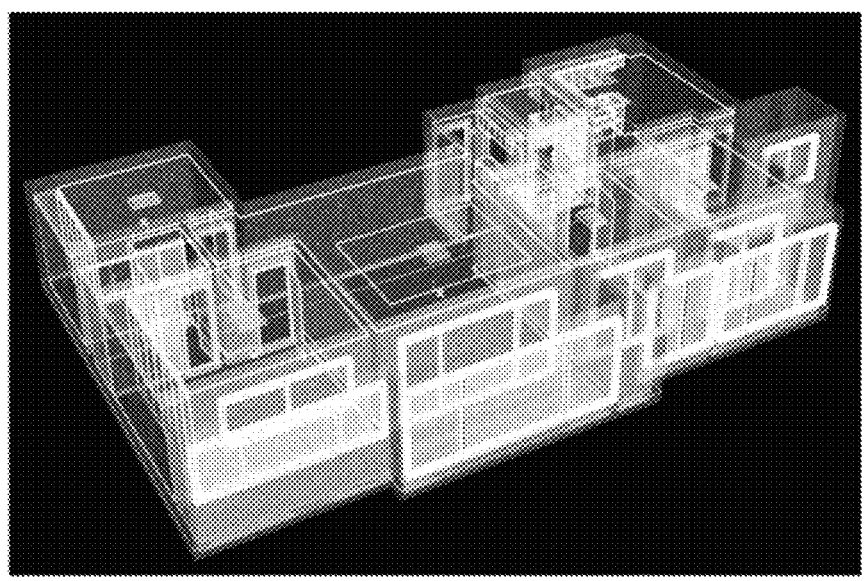
FIG. 6 is a drawing illustrating an example in which an element and height information are applied according to a spatial type.

FIG. 1 is a flowchart illustrating an automatic 3D solid modeling method based on a 2D drawing according to an embodiment of the inventive concept. FIG. 2 is a drawing illustrating a drawing image 100 including a space plot plan 110 according to an embodiment of the inventive concept. FIG. 3 is a drawing illustrating a process of extracting a vertex 111 in the drawing image 100. FIGS. 4A and 4B are drawings illustrating examples in which a cluster 200 which scans the vertex 111 passes through a specific point of a line segment of a figure. FIG. 5 is a drawing illustrating a process of extracting a line segment from the drawing image 100. FIG. 6 is a drawing illustrating an example in which an element and height information are applied according to a spatial type.

In FIGS. 1 to 6, the drawing image 100, the space plot plan 110, the vertex 111, a blank area 120, and the cluster 200 are shown.

Hereinafter, a description will be given of the automatic 3D solid modeling method and program based on the 2D drawing according to embodiments of the inventive concept with reference to drawings.

FIG. 1 is a flowchart illustrating an automatic 3D solid modeling method based on a 2D drawing according to an embodiment of the inventive concept.

Referring to FIG. 1, the automatic 3D solid modeling method based on the 2D drawing may include acquiring a drawing image 100 in step S100, generating a figure by extracting line segments in the drawing image 100 in step S200, identifying a sub-area within the figure and identifying a spatial type of the sub-area in step S300, and generating a 3D spatial model by applying height information corresponding to the spatial type of the sub-area in step S400. A description will be given of the automatic 3D solid modeling method based on the 2D drawing according to an embodiment of the inventive concept in order.

In step S100, a computer may obtain the drawing image 100. In other words, the computer may obtain a 2D drawing image shown in FIG. 2 to extract a characteristic of a 3D space. The drawing image 100 may be input by a user after he or she directly obtains the drawing image 100 from a website. Herein, the method for obtaining the 2D drawing image is not limited thereto. A variety of manners of inputting a 2D drawing image and inputting the entire area data, for example, a manner in which the user captures a picture or image including the drawing image 100 using a communication device including a camera and extracts the drawing image 100 from the picture or image, may be applied.

In step S200, the computer may generate the figure by extracting the line segments from the drawing image 100. The computer may recognize all line segments for dividing an area of the space plot plan 110 and may generate a figure configured with the recognized line segments.

The generating of the figure by extracting the line segments from the drawing image 100 may be performed according to recognizing the line segments based on a chromaticity difference between elements in the drawing image 100, identifying a vertex 111 of the recognized line segments, and generating the figure based on the vertex 111. First of all, the computer may recognize the line segments based on the chromaticity difference between the elements in the drawing image 100. Each of colors recognizable by the computer may have a unique red, green, and blue (RGB). For example, if each of the colors indicates a ratio of red to green to blue in order, red may correspond to (255, 0, 0) and black may correspond to (255, 255, 255). An outer wall or door, a window, and the like (hereinafter, referred to as "outer wall and the like") may be represented in a color which may be distinguished from other elements on the drawing image 100 (or the spatial plot plan 110). Thus, another color except for a color having an RGB value corresponding to the outer wall and the like may be deleted from the drawing image 100. For example, in general, since an outer wall and the like of the space plot plan 110 is displayed in black, the computer may delete another color except for an RGB value (255, 255, 255) corresponding to black from the drawing image 100.

A variety of manners may be applied to a method for recognizing an RGB value corresponding to the outer wall and the like on the drawing image 100. The computer may apply a manner of recognizing an RGB value of black generally used for expression of an outer wall and the like as the outer wall and the like or a manner of recognizing an RGB value corresponding to the darkest color in the drawing image 100 as an outer wall and the like. Further, the computer may allow the user to select a pixel portion corresponding to an outer wall to recognize a color corresponding to the outer wall. Herein, the method for recognizing the RGB value corresponding to the outer wall and the like on the drawing image 100 is not limited thereto. A variety of manners, for example, a manner of recognizing a color on the outermost location of the space plot plan 110 in the drawing image 100 as an RGB value of an outer wall and the like, may be applied.

Thereafter, the computer may identify the vertex 111 of the recognized line segments. As shown in FIG. 3, the identifying of the vertex 111 of the recognized line segments may be performed in such a manner to move the cluster 200 in one direction along a specific color and recognizing a point, where the consecutive specific color is cut off, as the vertex 111. The cluster 200 may be a set of grouping some adjacent pixels into one unit and may perform a function of moving within the drawing image and identifying the vertex 111 through a color difference. For example, If the cluster 200 of four horizontal pixels and four vertical pixels is used on the drawing image 100 in which all of the other colors except for a color corresponding to an outer wall and the like are deleted, the cluster 200 may recognize an area, where white is first changed to black, as a line segment in FIGS. 4A and 4B and may start to move along the line segment. If the cluster 200 recognizes a point changed from block to white in FIGS. 4A and 4B while it progresses, it may recognize the point as the vertex 111. The cluster 200 may recognize that black continues in a right direction and may continue scanning the vertex 111 in the right direction.

Thereafter, in FIG. 5, the computer may generate the figure based on the vertex 111. For example, the computer may generate the figure by connecting the vertices 111 recognized by the cluster 200 based on a path moved by the cluster 200.

Further, the generating of the figure may include obtaining real area data at the computer, extracting an outermost line of the figure, determining the entire region, and calculating an area of the entire region, and calculating a rate by comparing the calculated area with the obtained real area data and enlarging each line segment based on the rate. The calculating of the area of the entire region determined by the extracting of the outermost line may be performed on a pixel-by-pixel basis. In other words, the computer may determine an area by determining the number of pixels of the space plot plan 110. The obtaining of the real area data may be performed by receiving the real area data from the user or recognizing the area data in the drawing image 100. Herein, the manner of obtaining the real area data at the computer is not limited thereto. A variety of manners, for example, a manner of searching for and obtaining an area of a space corresponding to the drawing image 100 through wired and wireless communication at the computer, may be applied.

The extracting of the outermost line of the figure may be performed by applying a coordinate to the drawing image 100 and using the coordinate at the computer. In other words, the extracting of the outermost line of the figure may include setting an external specific point of the space plot plan 110 in the drawing image 100 to an origin point and assigning the coordinate to the identified vertex 111 with respect to the origin point and may extracting the outermost line by identifying the outermost vertex 111 based on the assigned coordinate of the vertex 111. First of all, the computer may set the external specific point of the space plot plan 110 in the drawing image 100 to the origin point and may assign the coordinate to the identified vertex 111 with respect to the origin point. For example, the computer may set a left lowermost point of the drawing image 100 to the origin point such that all points on the space plot plan 110 is points of a first quadrant. The computer may apply the coordinate to the vertex 111 with respect to the assigned origin point. For example, the computer may determine the number of pixels of x-axis and y-axis directions, spaced from the origin point and may assign the coordinate to the vertex 111 on a pixel-by-pixel basis. Thereafter, the computer may extract the outermost line by identifying the outermost vertex 111 based on the assigned coordinate of the vertex 111.

Thereafter, the computer may calculate the rate by comparing the calculated area with the obtained real area data and may enlarge each line segment based on the rate. Since a bottom surface of a real space corresponding to the obtained real area data and the space plot plan 110, the area of which is calculated, correspond to a similar figure, the computer may calculate an area difference rate by comparing the calculated area data with the obtained real area data and may generate a figure corresponding to the real space by enlarging the generated figure by the rate. If it is necessary to convert a unit, for example, if the calculated area data corresponds to a pixel unit without corresponding to a meter unit, converting the calculated data into a unit of the real area data may be further included.

In step S300, the computer may identify the sub-area in the figure and may identify the spatial type of the sub-area. The computer may recognize sub-areas which may correspond to a room, a bathroom, a terrace, or the like configured with the line segments and may identify the spatial type based on measurement data of the sub-areas. The spatial type may correspond to information about whether the entire area is a space of any purpose and may mean that the entire area is any space among patterns such as a residential space and a commercial space. Further, the spatial type may correspond to information about whether the sub-area is a space of any purpose in the entire area. If the space is an apartment, the spatial type may mean that the sub-area corresponds to any space among patterns such as a room, a bathroom, a porch, a kitchen, and the like. The measurement data may be numeric data measured from a figure to identify a characteristic of each space and may include an area of a space, a width and length ratio, a location of a sub-area in the entire area, and the like.

The computer may apply a manner of identifying a spatial type corresponding to the sub-area by comparing or analyzing the measurement data based on a guideline for a space, included in a building code and an international building code, as the manner of identifying the spatial type corresponding to the sub-area at the computer. In other words, the computer may store the guideline included in the building code or the international building code in a database and may compare measurement data of the sub-area with the guideline. If the computer compares the measurement data of the sub-area with the guideline and determines that the measurement data of the sub-area corresponds to a specific spatial type on the guide line, it may apply the sub-area to the spatial type. For example, if a specific sub-area is adjacent to an outermost line and meets a guideline of an advised range of 1200 to 1800 mm of a porch, the computer may recognize the sub-area as the porch.

In step S400, the computer may generate the 3D spatial model by applying the height information corresponding to the spatial type of the sub-area. In other words, in FIG. 6, the computer may search the database, which stores the guideline included in the building code or the international building code, for the height information corresponding to the spatial type of the sub-area and may apply the found height information. For example, in case of a residential facility, since a height between floors is advised as 2200 mm or more from the guideline, if a space corresponding to the space plot plan 110 is recognized or set as a residential facility, the computer may apply a height of 2200 mm. The computer may generate a 2D model as a 3D spatial model by applying the height information.

Further, applying an element corresponding to the spatial type of the sub-area may be further included. In FIG. 6, the computer may apply an element which should be included in the sub-area, based on the spatial type. The element may refer to a mandatory element configuring the sub-area. In other words, the element may include a room door, a window of a room, a window of a porch, a front door, or the like. In case of a bathroom, the element may include a sink, a toilet, a bathtub, or the like corresponding to a mandatory element. In case of a kitchen, the element may include a sink or the like. The computer may identify a type or condition of the element from the guideline for each spatial type and may apply the element which meets the identified type or condition of the element.

The computer may apply a manner of extracting the element corresponding to the spatial type from the guideline and generating the element on a proper location of a drawing as the manner of applying the element corresponding to the spatial type. The computer may apply a manner of determining a size of a specific figure indicated in a drawing, recognizing whether the figure is any element using the size, and generating the element on a 3D space as the manner of applying the element corresponding to the spatial type. For example, if the spatial type of the sub-area is recognized as a room, since a room door of a residential space is greater than or equal to 750 mm in width, the computer may recognize or classify a rectangle of 750 mm or more adjacent to a boundary line of the sub-area as the room door and may generate a 3D spatial model, thus generating the room door corresponding to the guideline.

Further, determining materials of a floor or wall corresponding to the spatial type and applying the determined materials to correspond to a scale of a 3D space may be further included. The computer may select the materials of the floor or wall corresponding to the spatial type of the sub-area. For example, if the sub-area corresponds to a bathroom, the computer may apply a wall to a tile pattern. Further, if the computer includes a library for materials of walls or floors, it may provide a list of materials of walls or floors corresponding to the spatial type such that a user selects materials of a floor or wall. Thereafter, if the materials of the floor or wall are determined, the computer may apply the materials of the floor or wall to correspond to the 3D space. The computer may apply, but is not limited to, a UV mapping manner as a manner of applying materials of a floor or wall to fit a scale of the 3D space. The computer may apply various computer graphic techniques for putting a 2D image on a surface of the 3D space and expressing a detailed texture or color.

Further, applying household furniture corresponding to the spatial type or a form of the space may be further included. The computer may recognize a pattern of household furniture which may be located according to the spatial type of the sub-area and may apply the pattern of the household furniture to the sub-area. The household furniture may refer to various products, such as a table, a couch, a wardrobe, and an electronic device except for the element, which may be located on each sub-area. If the computer includes a library of the household furniture, it may provide a list of household furniture corresponding to the spatial type such that the user selects the household furniture, or may recognize a proper form of household furniture and may apply the household furniture. Further, the computer may apply household furniture to vary in shape of household furniture applicable according to a form of the space. For example, the computer may change a form of a couch applicable according to a structure of a living room.

Further, calculating and determining an area which receives light by a location of a specific light source and correcting a 3D image in consideration of a location or color of a shape in a 3D space may be further included. For example, the computer may determine a location of a light source based on a location of a window of a porch and may calculate and recognize a surface of the 3D space, which receives light from the light source. Thereafter, the computer may generate in which the location or color of the shape in the 3D space and light by the light source are reflected.

The above-mentioned automatic 3D solid modeling method based on the 2D drawing according to an embodiment of the inventive concept may be implemented with a program (or an application) to be combined with hardware and be executed and may be stored in a medium.

The hardware may include all electronic devices corresponding to a computer. In other words, the hardware may be implemented with a variety of devices such as a mobile phone, a smartphone, a tablet computer, a laptop computer, a digital broadcast terminal, personal digital assistants (PDA), a portable multimedia player (PMP), a navigation device, a digital television (TV), and a desktop computer.

For the hardware to read the program and execute the methods implemented with the program, the above-mentioned program may include a code coded into a computer language such as C, C++, Java, JavaScript, or a machine language readable through arithmetic processing of the hardware device by a processor (CPU) of the hardware. Such a code may include a functional code associated with a function and the like defining functions necessary for executing the methods and may include a control code associated with an execution procedure necessary for executing the functions according to a procedure at the processor of the hardware. Further, such a code may further include a code associated with memory reference about whether additional information or media necessary for executing the functions at the processor of the hardware is referred at any location (address number) of an internal or external memory of the hardware. Further, if it is necessary for the processor of the hardware to communicate with any computer or server located in a remote place to execute the functions, the code may further include a communication related code about how communication is performed with any computer or server located in a remote place using a communication module of the hardware and whether to transmit and receive any information or media upon communication.

The medium may refer to a device-readable medium which stores data on a semipermanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the hardware or various storage media on the hardware of the user. The medium may be distributed to a computer system connected over a network and may store a computer-readable code on a distributed basis.

According to an embodiment of the inventive concept, there may be the following various effects.

First, the embodiment of the inventive concept may be convenient without the necessity of visiting a real 3D space to implement the real 3D space on a computer and may remarkably reduce time taken to implement a 3D space. In other words, the embodiment of the inventive concept may shorten time taken to make one 3D space within two minutes.

Second, users may provide the generated 3D space information online. Others may verify space information similar to a real thing through visual stereoscopic data without vising a real space.

Third, the embodiment of the inventive concept may provide space information of high reliability by performing 3D modeling based on an accurate numeric value. In other words, since the computer generates a 3D file including real physical information such as a length, a width, and a volume of a real space, users may verify and use a real physical numeric value through a modeled 3D space.

Fourth, since the user uses only a 2D drawing image and real area data when performing 3D space modeling, the embodiment of the inventive concept may be very convenient because there is little information for requesting the user to perform the modeling.

Fifth, the embodiment of the inventive concept may generate a 3D space using real physical information (a real size) and may use the generated 3D space as a platform of the latest information technology (IT) such as augmented reality (AR) and internet of things (IoT). Further, the embodiment of the inventive concept may use the generated 3D space as a cyber space, such as a game or virtual reality (VR), which may be experienced by the user and may use the generated 3D space as visual data and resources of an interior architectural field and a real estate relevant field.

Lastly, the embodiment of the inventive concept may accurately determine a spatial type as the computer analyzes and determines the spatial type according to a spatial type determination algorithm based on a building code or an architectural design manual. Further, the embodiment of the inventive concept may simply generate a space corresponding to reality by applying a height of a space or an element of the space (a size of a door and the like) based on the building code or the architectural design manual.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An automatic three-dimensional (3D) solid modeling method based on a 2D drawing, the method comprising:
   receiving an image captured by a camera;
   extracting a drawing image from the received image;
   generating a figure by extracting line segments from the extracted drawing image;
   identifying a sub-area in the figure and identifying a spatial type of the sub-area; and
   generating a 3D spatial model by applying height information corresponding to the spatial type of the sub-area,
   wherein the generating of the figure comprises:
   recognizing the line segments based on a chromaticity difference between captured elements in the drawing image; and
   identifying a vertex of the recognized line segments and generating the figure based on the vertex,
   wherein the identifying of the spatial type comprises:
   comparing measurement data of the sub-area with data included in a guideline for each spatial type, the guideline being stored in a database, and recognizing the spatial type corresponding to the measurement data,
   wherein the applying of the height information comprises:
   searching for and applying the height information corresponding to the spatial type in the guideline, and
   wherein
   the guideline includes an advised range of the each spatial type, and
   the recognizing of the spatial type comprises:
      determining which spatial type has an advised range corresponding to the measurement data of a respective sub-area; and
      recognizing the determined spatial type as the spatial type of the respective sub-area.

2. The method of claim 1, wherein the identifying of the vertex of the recognized line segments comprises:
   recognizing a point, where a consecutive color is cut off, as the vertex while moving a cluster of a size in one direction along the color.

3. The method of claim 1, further comprising:
   applying an element corresponding to the spatial type of the sub-area.

4. The method of claim 1, further comprising:
   determining materials of a floor or wall corresponding to the spatial type and applying the determined materials to the floor or wall to correspond to a scale of a 3D space; and
   applying household furniture corresponding to the spatial type or a form of a space.

5. The method of claim 4, further comprising:
   calculating and determining a surface which receives light by a location of a light source; and
   correcting a 3D image in consideration of a location or color of a shape in the 3D space.

6. A non-transitory computer-readable recording medium storing an automatic 3D solid modeling program based on a 2D drawing, and configured to be combined with hardware, the program includes instructions to execute a method comprising:
   receiving an image captured by a camera;
   extracting a drawing image from the received image;
   generating a figure by extracting line segments from the extracted drawing image;
   identifying a sub-area in the figure and identifying a spatial type of the sub-area; and
   generating a 3D spatial model by applying height information corresponding to the spatial type of the sub-area,
   wherein the generating of the figure comprises:
   recognizing the line segments based on a chromaticity difference between captured elements in the drawing image; and
   identifying a vertex of the recognized line segments and generating the figure based on the vertex,
   wherein the identifying of the spatial type comprises:
   comparing measurement data of the sub-area with data included in a guideline for each spatial type, the guideline being stored in a database, and recognizing the spatial type corresponding to the measurement data,
   and
   wherein the applying of the height information comprises:
   searching for and applying the height information corresponding to the spatial type in the guideline, and
   wherein
   the guideline includes an advised range of the each spatial type, and
   the recognizing of the spatial type comprises:
      determining which spatial type has an advised range corresponding to the measurement data of a respective sub-area; and
      recognizing the determined spatial type as the spatial type of the respective sub-area.

7. The method of claim 1, wherein the image captured by the camera comprises at least one of a still image and a video image, which are captured by a communication device including the camera.

8. The method of claim 1, wherein the recognizing of the line segments comprises:
   receiving a user selection of a pixel portion corresponding to an outer wall; and
   recognizing a color corresponding to the outer wall to recognize the line segments based on a chromaticity difference between elements having the recognized color and the other elements in the drawing image.

9. The method of claim 1, wherein the recognizing of the line segments comprises:
   recognizing a color on an outermost location of a space plot plan in the drawing image;
   recognizing the line segments based on a chromaticity difference between elements having the recognized color and the other elements in the drawing image.

10. An automatic three-dimensional (3D) solid modeling method based on a 2D drawing, the method comprising:
    receiving an image captured by a camera;
    extracting a drawing image from the received image;
    generating a figure by extracting line segments from the extracted drawing image;
    identifying a sub-area in the figure and identifying a spatial type of the sub-area; and
    generating a 3D spatial model by applying height information corresponding to the spatial type of the sub-area,
    wherein the generating of the figure comprises:
    recognizing the line segments based on a chromaticity difference between captured elements in the drawing image; and
    identifying a vertex of the recognized line segments and generating the figure based on the vertex,
    wherein the identifying of the spatial type comprises:
    comparing measurement data of the sub-area with data included in a guideline for each spatial type, the guideline being stored in a database, and recognizing the spatial type corresponding to the measurement data, wherein the applying of the height information comprises:

searching for and applying the height information corresponding to the spatial type in the guideline, and wherein the guideline includes a minimum height of each spatial type, and the searching for and applying the height information comprises:

searching for the minimum height corresponding to the recognized spatial type; and applying the searched minimum height in generating the 3D spatial model of the sub-area.

\* \* \* \* \*